Oct. 3, 1967  G. N. KATSELIS ET AL  3,345,566
VARIABLE RESISTANCE ASSEMBLY EMPLOYED
IN A MEASURING REBALANCE APPARATUS
Filed Feb. 12, 1964  3 Sheets-Sheet 1
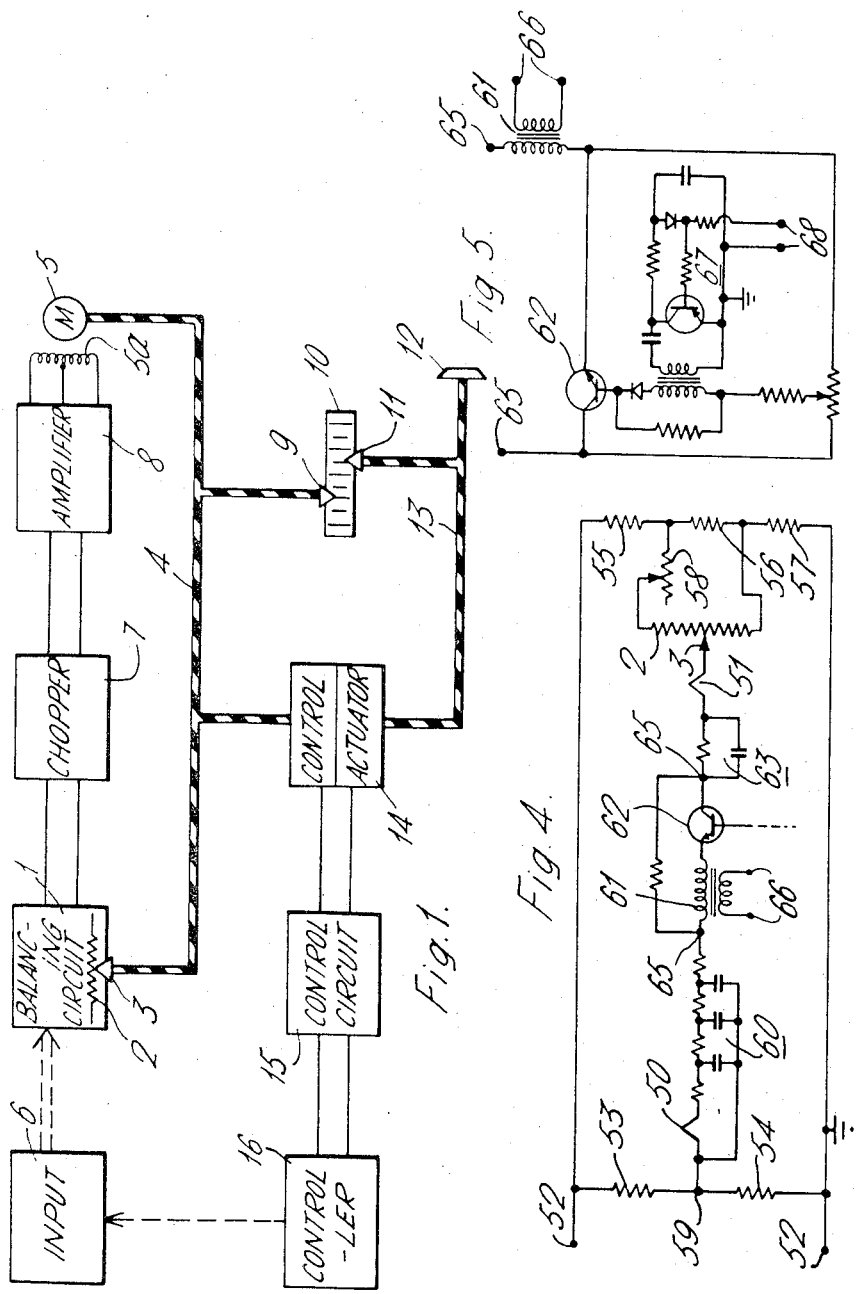
GEORGE NICOLAS KATSELIS
ALISTAIR LYLE MC KENZIE ROBERTSON
INVENTORS
BY *Arthur H. Swanson*
ATTORNEY

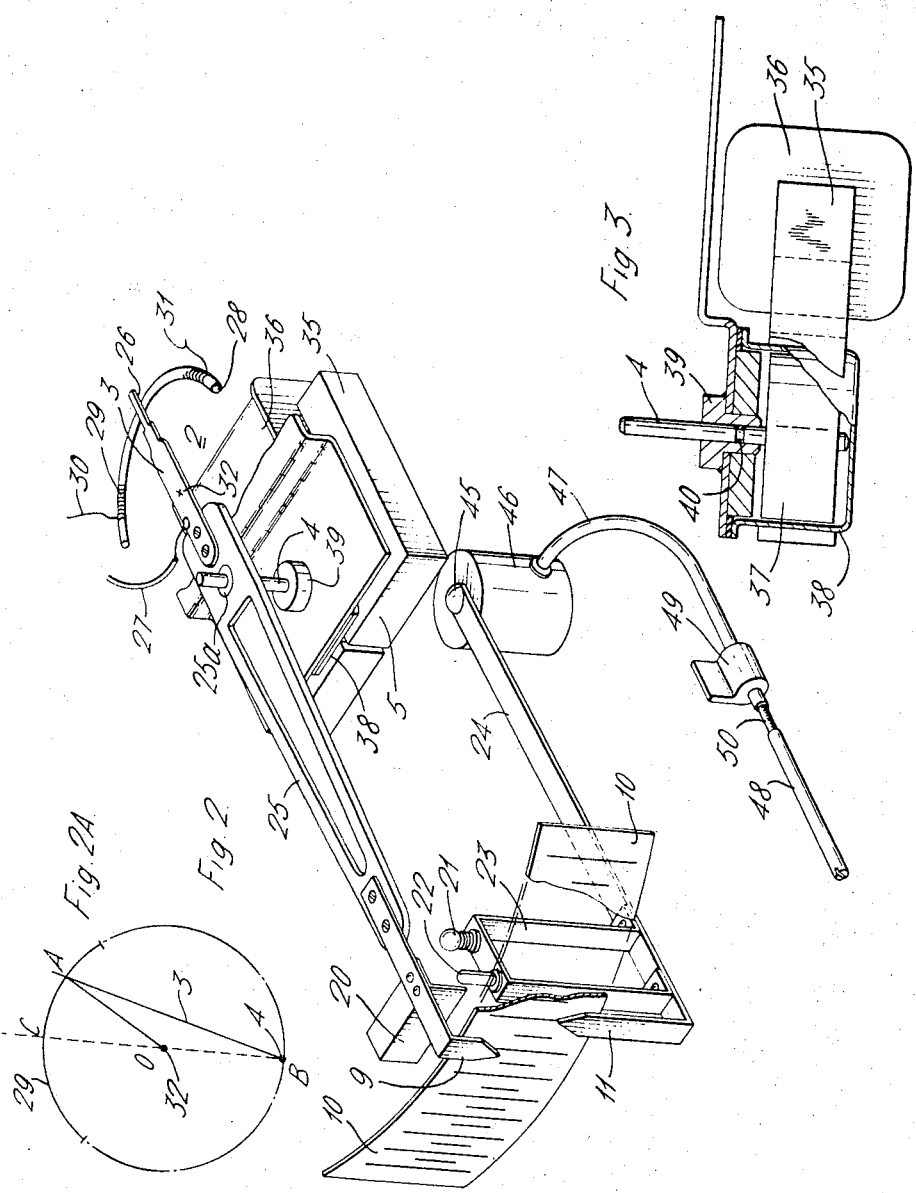

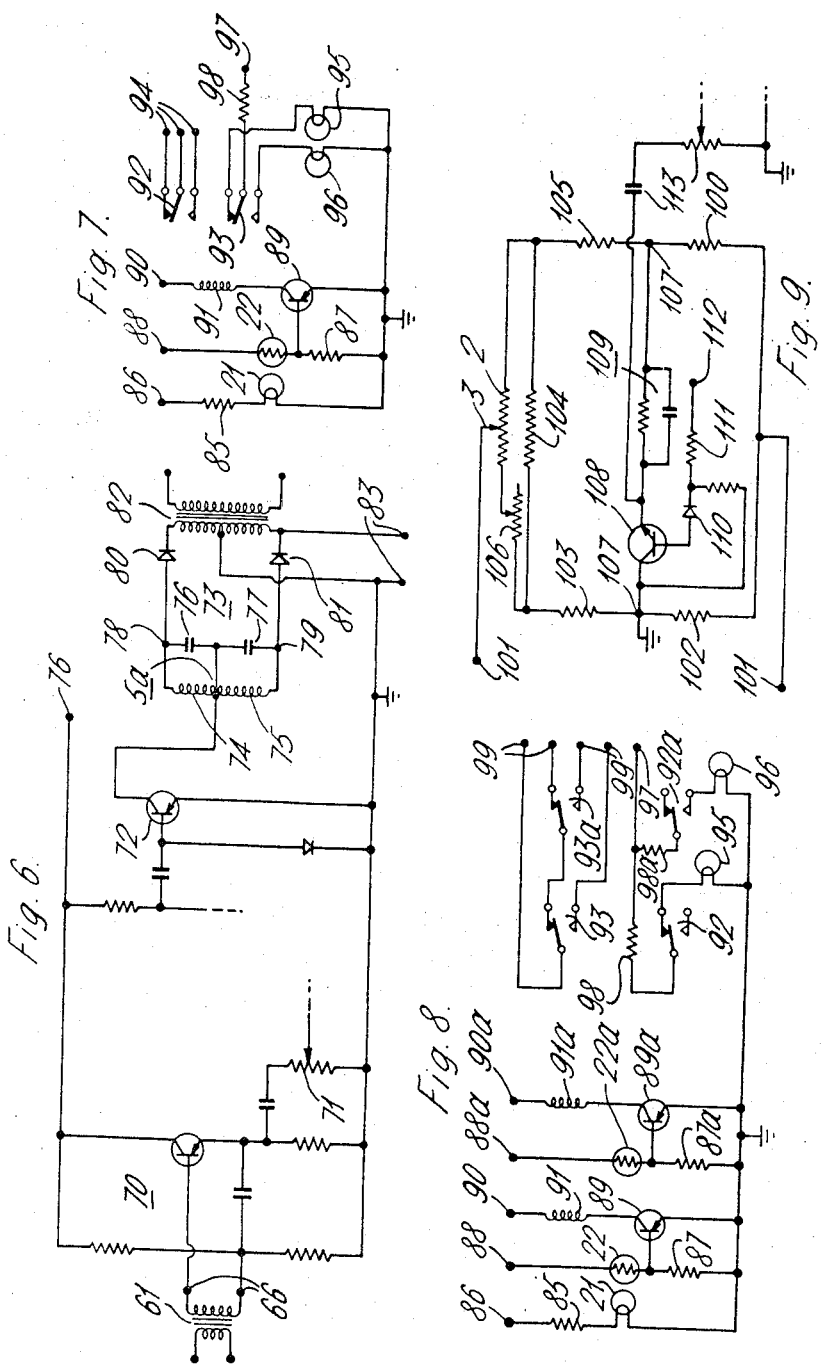

United States Patent Office 3,345,566
Patented Oct. 3, 1967

3,345,566
VARIABLE RESISTANCE ASSEMBLY EMPLOYED IN A MEASURING REBALANCE APPARATUS
George N. Katselis and Alistair L. M. Robertson, Glasgow, Scotland, assignors to Honeywell Inc., a corporation of Delaware
Filed Feb. 12, 1964, Ser. No. 344,399
Claims priority, application Great Britain, Feb. 15, 1963, 6,341/63
10 Claims. (Cl. 324—99)

The present invention relates to variable electric resistance devices and apparatus incorporating such devices. In particular, the invention is concerned with variable resistance devices of the kind (hereinafter referred to as the "kind specified") which includes an extended resistance element, for example, a length or coil of resistance wire or a carbon or graphite resistance element, and a wiper arm having a contact member in physical contact with the resistance element so as to provide an electrical connection at a particular point (in practice ideal point contact may not be possible) along the length of the element, the wiper arm being movable so that the contact member can be moved to make contact at any desired point along the length of the whole or a part of the resistance element.

In devices of the kind specified, difficulties arise due to wear of the contact member. It has been proposed to overcome this by arranging that the contact member, when being moved along the resistance element, also moves transversely relative to the element, so that different parts of it come into contact with the element and the wear is thus distributed. For example, where the resistance element lies along a straight line it has been proposed to make the wiper arm pivot instead of moving along a straight line, so that the contact member describes an arc of large radius whilst moving along the length of the resistance element. Again, with an arcuate resistance element it has been proposed to pivot the wiper arm about an axis which is displaced slightly from the centre of the circle on which the element lies. A difficulty arises with both these proposals, however, if it is required to maintain accurately a particular relationship between the extent of a given wiper arm movement and the resistance lying between the points on the resistance element with which the contact member makes contact at either end of that movement. For convenience, this resistance will be referred to as "the resistance change." Commonly, the resistance element may be a linear one and it might then be required to maintain an accurate linear relationship between the wiper arm movement and the consequent resistance change.

According to the present invention there is provided a variable electric resistance device of the kind specified which comprises an arcuate resistance element, a wiper arm pivoted about an axis passing through a point on the circumference of the circle of which the arc forms part, the said axis being perpendicular to the plane of the circle, and a contact member which is carried by the wiper arm and is of sufficient length to remain in contact with the element over the whole of the permitted angular range of movement of the wiper arm.

The point on the circumference of the circle will usually be spaced away from the resistance element and in many cases will lie directly opposite the mid point of the element. The resistance element will usually be a linear one but it may be one in which the variation of resistance along its length obeys any other required law.

Variable resistance devices of the kind specified are employed in many forms of electrical or electro-mechanical apparatus. For example, they are employed in self-balancing bridge apparatus, as a variable element in an electrical bridge circuit in which either another element varies in dependence upon the magnitude of some input variable or there is provided some means for applying an electrical signal varying in dependence on some input variable. The input variable may, for example, be a temperature or a pressure. Usually a self-balancing bridge will also include an amplifier-motor combination which responds to any bridge unbalance voltage to energise the motor which is mechanically coupled to the wiper arm of the variable resistance device to drive it in the direction required to restore balance. The position of the wiper arm in operation is, therefore, at all times representative of the magnitude of the input variable and an indicator or a recorder, for example, can be coupled to the drive from the motor to the wiper arm to provide an indication or record of the magnitude of the input variable.

According to another aspect of the present invention, therefore, there is provided electrical or electro-mechanical apparatus including a variable resistance device according to the present invention.

In particular, there may be provided a self-balancing apparatus including a variable resistance device according to the present invention, means for generating an unbalance signal representing any difference between the actual magnitude of an input variable and the represented magnitude of that variable as determined by the position of the wiper arm of the resistance device and an electric motor which is controlled in accordance with the unbalance signal to drive the wiper arm in such a sense as to reduce any unbalance signal towards zero. Preferably, the apparatus will include an amplifier to the input of which the unbalance signal, or a signal derived therefrom, is applied and the output of which is applied to one or more windings of the motor to control the operation thereof.

The self-balancing apparatus may be a self-balancing bridge apparatus having a first variable element which is the variable resistance device and either a second variable element, the magnitude of which is caused to vary in dependence upon the actual magnitude of the input variable, or means for applying to it an electric signal varying in dependence upon the actual magnitude of the input variable.

Examples of a self-balancing bridge apparatus including a variable electric resistance device according to the present invention will now be described with reference to the accompanying drawings in which—

FIGURE 1 shows a schematic block diagram of the basic features of the apparatus, FIGURE 2 is a perspective view of parts of the apparatus showing the arrangement of the moving parts, FIGURE 2A is a diagram illustrating the operation of a part of FIGURE 2, FIGURE 3 is a section through a motor included in the apparatus, FIGURES 4–6 show diagrams of electronic circuits employed in a form of the apparatus for use with a thermocouple as input sensor, FIGURES 7–8 show two forms of control circuit, and FIGURE 9 shows parts of the circuit of a modified apparatus for use with a temperature sensitive resistance element as the input sensor.

FIGURE 1 shows an outline block schematic diagram of the basic features of the apparatus. As shown, the apparatus which is designed for measuring, indicating and controlling the magnitude of an input variable, includes a balancing circuit 1 part of which is a variable electric resistance device 2 in accordance with the invention. The construction of the device 2 is described below with reference to FIGURE 2 of the drawings. The wiper arm 3 is represented schematically in FIGURE 1 as being driven by a shaft 4 which in turn is driven by a motor 5. The balancing circuit 1 is also shown as having a variable link to an input 6. This link may take many forms depending on the nature of the variable, but, in any case, the effect that some element in the balancing circuit is caused to vary in dependence on the magnitude of the variable or that an electric signal, e.g. a potential or a current, varying in dependence on the magnitude of the variable is applied to the balancing circuit.

The balancing circuit operates to generate an electrical unbalance signal in the form of a D.C. voltage, which represents any difference between the actual value of the input variable and the notional value represented by the position of the wiper arm 3. This voltage is applied to the input of a transistor chopper circuit 7 to derive a signal suitable for application to the input of an A.C. transistor amplifier 8. The output of the amplifier 8 energises a winding 5a of the motor 5 in such a manner that the motor drives the shaft 4 and hence the wiper arm 3 in the sense required to reduce the unbalance signal towards zero. The position of the wiper arm 3 will thus at all times represent the magnitude of the input variable and it is therefore possible to provide an index 9 which is driven by the motor shaft 4 and moves across a scale 10 to provide an indication of the magnitude of the input variable.

To enable the apparatus to control the magnitude of the input variable, there is further provided a set-point index 11 which can be set at any desired point along the scale 10 by means of a manually adjustable control 12 driving a shaft 13. The shaft 13 also positions one part of a control actuator 14, the other part of which is positioned by a drive from the motor shaft 4. The control actuator 14 is connected electrically to a control circuit 15, the actuator 14 and circuit 15 together providing electrical or other signals for actuating a controller 16 capable of changing or causing the change of the magnitude of the input variable so as to maintain the index 9 in alignment with the set-point index 11.

In a modified arrangement, not shown, the control actuator 14 may be coupled to a pneumatic or hydraulic controller.

The dotted link 17 in FIG. 1 between the controller 16 and the input 6 is intended to indicate this control function whichever of the many available forms it may take. For example, where the input variable is a temperature, the controller may be a simple on-off controller for a burner installation, the control actuator 14 and circuit 15 operating to switch the controller "on" whenever the indicated temperature falls below the value indicated by the set-point index 11. Similarly, a simple proportional controller or a controller having any other desired mode of action may be employed.

FIGURE 2 shows a perspective view of the moving parts of the apparatus described with reference to FIGURE 1 in a case where the control actuator 14 consists simply of a vane 20 carried by the pointer 9 and arranged to interrupt the passage of light between a lamp 21 and a photo-diode 22 carried on a bracket 23 attached to an arm 24 which carried the set-point index 11.

The various parts shown in FIGURE 2 are all suitably supported on a metal instrument chassis (not shown) which fits inside a case (not shown) having a window through which the scale 10 and the indices 9 and 11 can be viewed. The scale 10 is shown partly broken away in FIG. 2 so that other parts of the apparatus can be seen. The index 9 is carried by an arm 25 which is secured to and pivots with the shaft 4 of the motor 5, the arm 25 being provided with a bush 25a and grub screws (not shown) for this purpose. The arm 25 also extends on the opposite side of the shaft 4 from the index 9 and at the other end carries the wiper arm 3 of the variable resitance device 2, the wiper arm 3 being mounted so that it is electrically insulated from the arm 25. The wiper arm 3 carries a contact member 26, in the form of a length of silver rod and has an electrical lead 27 soldered to it.

The resistance device 2 has an arcuate resistance element consisting of an arcuate copper former 28 which is varnished to insulate it from the winding and which carries a uniformly wound resistance coil 29, the two ends of which are soldered to electrical leads 30 and 31. The coil 29 may in a typical case consist of 137 inches of 47 S.W.G. manganin wire having a total resistance of 1250 ohms. The contact member 26 bears on the upper edge of the coil and former. Considering the arrangement in plan only, both the point on which the arc of the former 28 is centred, and the mid point of that arc lie on the line joining the centre of the scale 10 to the shaft 4. The central point is positioned on the side of the shaft 4 remote from the scale 10 by a distance equal to the radius of the arc. Its position is marked by the cross 32 in FIG. 2. In this way, it is arranged that the wiper arm 3 pivots about an axis which passes through a point on the circumference of the circle of which the arc of the former 28 is part, and is normal to the plane of that circle.

FIG. 2A shows a diagram illustrating this arrangement the wiper arm 3 being shown displaced from the position in which the contact member 26 is in contact with the mid-point of the resistance coil 29. From this it will be seen that, wherever the point A is positioned along the coil 29, the angle CBA is half the angle COA. The length of the arc CA is therefore always proportional to the angle CBA. As a result, for any movement of the wiper arm 3, the resistance change (i.e. the resistance between the points of contact at either end of the movement) is always directly proportional to the angular movement of the wiper arm 3. Similarly, if the coil 29 is wound in such a manner that the resistance change in both directions from the point C follows a particular non-linear law with distance along the former 28, the law relating angular movement of the wiper arm 3 and resistance change will be the same apart from a factor of two.

The motor 5 is shown only in outline in FIGURE 2 and reference should now be made in addition to FIGURE 3 which shows a section through the motor in a plane containing the axis of the shaft 4.

The motor 5 is basically a moving iron movement, having a soft iron core 35 which is effectively the main framework of the motor. This carries a single centre-tapped field coil 36 mounted on a leg joining the two pole pieces which are formed to provide a cylindrical gap (see FIG. 2) in which the rotor 37 is mounted. The rotor 37 is simply a cylindrical permanent magnet, magnetised along a diameter, and is mounted on the shaft 4 within a cylindrical brass case 38 which fits into the gap between the pole pieces. The case 38 is filled with a silicone fluid (not shown), the viscosity of which is chosen suitably to reduce the speed of movement of the rotor 37. The shaft 4 is supported in the case 38 by a journal bearing 39 where it passes to the exterior, this incorporating an O-ring seal 40. The end of the shaft 4 within the case 38 is rounded and rests lightly against the inner surface of the case 38.

The arm 24 carrying the set-point index 11 is mounted on the output shaft 45 of a simple crown and pinion gearbox 46, the shaft 45 being coaxial with but beneath the shaft 4 of the motor 5. The input shaft or the gearbox 46 is coupled by a conventional flexible drive 47 to a shaft 48 having a cross cut end which is brought out to the front of the instrument panel. The end of the flexible drive 47 remote from the gearbox 46 is supported by a bracket 49 which is rigidly mounted on the instrument's chassis, and is coupled by a screw coupling 50 to the shaft 48. The position of the set-point index 11 can by this means be adjusted to any desired point within the whole extent of the scale 10 by rotating the shaft 48 manually with a screw driver or similar instrument.

FIGURES 4 of the drawings shows an example of the form that the balancing circuit 1 may take when the input 6 is derived from a thermocouple, the hot junction 50 of which is exposed in known manner to the temperature within a temperature controlled enclosure, for example, an oven, and the cold junction 51 of which is mounted within the apparatus in a manner which will be described below. The balancing circuit is basically a bridge circuit the bridge voltage for which is applied to terminals 52 to which the output of a 12 v. D.C. stabilised power supply (not shown) of conventional form is connected within the apparatus. One side of the bridge consists of resistors 53 and 54 in series and the other side consists of resistors 55–57 in series, with a variable resistor 58 and whole of the resistance of the variable resistance element 2 connected in series with one another and in parallel with resistor 56.

The two thermocouple junctions 50 and 51 are connected in series in a circuit extending from the common terminal 59 of resistors 53 and 54 to the wiper arm 3 of the resistance element 2. This circuit includes the hot junction 50 of the thermocouple, a filter circuit 60, the input circuit of the chopper 7 which consists of the primary winding of the transformer 61 and the emitter to collector circuit of a symmetrical transistor 62, a parallel resistance-capacitance combination 63, and the cold junction 51 of the thermocouple. It will be seen that balance can be achieved if the wiper arm 3 is adjusted to a point on the resistance element such that the potential difference between it and terminal 59 is balanced by the E.M.F. generated by the thermocouple. If there is any unbalance, a current will flow in one direction or other through the input circuit of the chopper 7 which operates to produce an amplitude modulated square wave for application to the amplifier 8, the phase of which is determined by the sense of current. Resistor 54 is a temperature sensitive resistance, element, such as a bobbin of copper wire, and the cold junction 51 of the thermocouple is positioned within this bobbin so that both are subject to the same ambient temperature changes, this in known manner providing compensation for any variations of the temperature of the cold junction 51.

The variable resistor 58 provided in series with the resistance element 2 is pre-set to enable the total voltage drop across the resistance element 2 to be varied; for example, if it is required to use the apparatus in different applications where the range of temperature variation is considerably different.

The chopper 7 has a circuit similar to those described in the complete specification of our British patent application 29,036/60 (now British Patent 1,004,621) and will not therefore be described in detail here although it is shown in FIGURE 5 of the drawings. The terminals 65 of this circuit are those which are connected into the balancing circuit of FIGURE 4 while the terminals 66 of the secondary winding of transformer 61 are for connection to the input of the amplifier 8. As described in the aforesaid patent specification, the transistor 62 has a square wave oscillation applied to its base. This is generated by a conventional transistor squaring circuit 67, the input terminals 68 of which are connected across a 12 v. A.C. voltage supply source as described with reference to FIGURE 6.

FIGURE 6 of the drawings shows in detail parts of the circuits of the amplified 8. This includes an input stage 70 which is an emitter follower circuit, the input of which is coupled to the terminals 66 of the secondary winding of transformer 61. The output of the stage 70 is taken from across the slider of potentiometer 71 and earth and is applied to the input of the first of three common transistor amplifier stages coupled in cascade. These are conventional in design and their circuits are not shown in FIGURE 6. The output from the third of these stages is applied to the base circuit of an output transistor 72 the emitter of which is earthed and the collector of which is connected to a phase sensitive network 73 which includes the two halves 74 and 75 of the field winding 5a of the motor 5. The input stage 70 and the three common emitter stages all employ a —12 v. D.C. power supply which is connected across terminal 76 and earth from a power pack within the apparatus.

In addition to the two winding parts 74 and 75, network 73 includes a pair of equal smoothing capacitors 66 and 67 each of which is connected in parallel with one of the winding parts 74 and 75. The terminals 78 and 79 at the opposite ends of the network formed by the winding 5a and capacitors 76 and 77 are each connected to the positive pole of a semi conductor diode 80 or 81 the negative poles of which are connected to the opposite ends of the centre tapped secondary winding of a mains transformer 82. The centre tap of this winding is connected to the amplified earth line and the primary winding is connected, for example, through fuses and a mains switch to terminals which in operation are connected across an A.C. mains supply. Transformer 82 is a step-down transformer such that the peak voltage appearing at either end of the secondary winding with respect to earth is ±12 v. For convenience, the A.C. voltage required for application to terminals 68 in the chopper 7 may be taken from across one end of the secondary winding of transformer 82 and earth. This is shown in FIGURE 6 by the connections to terminals 83 which are connected to the terminals 68 in the chopper 7.

In operation, the phase of the amplitude modulated square wave appearing at the terminals 66 at the input of amplifier 8 will be either the same or opposite to that of the voltage appearing across terminals 83 depending upon the sense of the unbalance voltage in the balancing circuit 1. The phase sensitive network 73 therefore allows current to flow through one or other of the motor winding parts 74/75 depending on which end of the secondary winding of transformer 82 is negative during the half cycles in which transistor 72 conducts. The appropriate one of the capacitors 76 and 77 operates to smooth this current. Since the two winding parts 74 and 75 are wound in the same sense on the core of the motor 5, the current will cause the rotor to be deflected in one sense or another by an amount depending on the magnitude of the unbalance voltage. As described above with reference to FIGURES 1 and 2 this deflection is arranged to alter the position of the wiper arm 3 of the resistance element 2 in the sense required to reduce the unbalance voltage towards zero.

In the apparatus described with reference to FIGURE 2, the control actuator 14 has one part consisting of a vane 20 mounted on the indicating index 9 and a second part consisting of a lamp 21 and photo-diode 22 mounted on the set-point index 11. The vane 20 is arranged so that it cuts off the light passing from the lamp 21 to the photo-diode 22 just at the point that the index 9 comes into coincidence with the index 11 when moving from left to right as shown in FIGURE 2, i.e. in the present case when the temperature which it indicates is increasing towards the set-point temperature from below. The vane 20 is long enough that it continues to interrupt light from lamp 21 if the index 9 rises to a point indicating a temperature of 4° C. above the temperature indicated by the set-point index 11. Further motion of the index 9 is then prevented by a stop mechanism (not shonw) mounted on the arms 24 and 25.

Assuming that the temperature being measured by the thermocouple is to be controlled by a simple on/off control which operates to switch on a source of heat for the oven when the temperature is below the set-point and to switch it off when the temperature reaches the set-point, a control circuit such as that shown in FIGURE 7 may be employed. This shows the lamp 21 connected in series with a small resistor 85 between a terminal 86 and earth, a 12 v. A.C. voltage source being connected across terminal 86 and earth from the instrument's power pack. The photo-diode 22 is connected in series with a resistor 87 between a terminal 88 and earth, terminal 88 being connected to a —12 v. D.C. stabilised power supply. The base of a transistor 89 is connected to the common terminal of the diode 22 and the resistor 87, its emitter being earthed and its collector being connected to a terminal 90 through a relay winding 91. Terminal 90 is connected to a −15 v. D.C. power supply.

As long as the temperature is below the set-point temperature and light from the lamp 21 falls on the photo-diode 22, its resistance will be small and the voltage applied to the base of the transistor 89 will be sufficiently negative to allow it to conduct, thus energising the relay winding 91. As soon as the temperature and the light is interrupted, the resistance of photo-diode 22 increases to a value such that the transistor 89 is cut off and relay winding 91 is de-energised. The relay has two changeover contacts 92 and 93. Contact 92 is simply connected to a set of three terminals 94 which can be connected into a circuit for controlling application of heat to the oven in which the thermocouple is mounted in such a manner as to cause the application of heat when the lower two terminals 94 are connected by contact 92 and to cut off the source of heat when the upper two terminals 94 are connected by contact 92. Contact 93 is connected into a circuit with a pair of indicating lamps 95 and 96, a current limiting resistor 98, and a terminal 97 to which a 12 v. A.C. voltage supply is connected. Terminal 97 is connected to the moving member of contact 93 so that lamp 96 is energised if the relay is energised and the temperature is below the set-point temperature and lamp 95 is energised when the temperature reaches a set-point. Lamps 95 and 96 might for example be different coloured lamps to provide a clear indication of the condition existing.

By simple modification the apparatus may be arranged to effect what is sometimes referred to as "three-zone control," whereby, if the temperature of the oven is below the set-point temperature, a source of heat is switched on, this source being switched off when the temperature is in a small zone of temperatures, extending for example for 4° C., around the set-point temperature, and some means for cooling the oven being brought into operation if the temperature passes out of the top of the "off" zone. To achieve this, a second vane is mounted on the indicating index 9 beside the vane 20 but positioned so that it passes on the side of the lamp 21 which is remote from the photo-diode 22. A second photo-diode is mounted on the bracket 23 so that the light path from lamp 21 to it can be interrupted by the second vane. The leading edge (i.e. the end nearer the high end of the scale 10) of the second vane is set nearer to the lower end of the scale 10 than the leading edge of vane 20 by an amount equivalent to the temperature range required for the "off" zone. In operation, therefore, as the temperature increases from below the set-point temperature, the light to diode 22 will be interrupted as the temperature reaches the lower limit of the "off" zone but the other diode will continue to be illuminated unless and until the temperature reaches the upper limit of the "off" zone. If the temperature continues to rise for any reason, the stop described previously prevents the index 9 travelling so far up the scale 10 that the trailing edges of the vanes pass and re-expose the diodes to the lamp.

FIGURE 8 of the drawings shows a control circuit which may be employed in such a case. Apart from the interconnection of the relay contacts, and the fact that there is only one lamp 21, this is simply a duplicate version of the ON/OFF control circuit shown in FIGURE 7. The same reference numerals are used in FIGURE 8 as in FIGURE 7 with the addition of a suffix *a* for the circuit elements associated with the second photo-diode 22a.

The interconnection of the contacts 92 and 92a is such that if both relay coils 91 and 91a are energised, i.e. the temperature is low, there is a circuit from terminal 97 through resistor 98a, contact 92a and lamp 96 to earth which results in lamp 96 being lit. In the "off" zone, relay coil 91 will be de-energised and there will be a parallel circuit through resistor 98, contact 92 and lamp 95 to earth which results in both lamps 95 and 96 being lit.

Above the "off" zone, both relay coils 91 and 91a are de-energised and there will be only one circuit, that through contact 92 and lamp 95, so that only lamp 95 is lit. Thus one or other of lamps 95 or 96 is lit if the temperature is outside the "off" zone and both lamps are lit if it is within the "off" zone. Contacts 93 and 93a are used to connect the upper one of four terminals 99 to a different one of the lower three terminals, depending on the operating conditions.

It will be appreciated that the use of a thermocouple to provide an input signal to the balancing circuit 1 is only an example of many possibilities. With the same variable, temperature, other sensing elements such as temperature sensitive resistance elements may be employed, and a great variety of other variables, e.g. pressure, humidity, pH value or conductivity, may be sensed to provide either an input signal for application to the balancing circuit or to cause variation of the magnitude of a circuit element connected in the balancing circuit.

As an example of a case in which the input variable causes an element of the balancing circuit to change its magnitude, FIGURE 9 shows the circuits of parts of the balancing circuit, the chopper 7 and the amplifier 8, for a case where the variable is temperature and the sensing element is a platinum resistance element which is represented simply as a resistance 100. The balancing circuit is again a bridge circuit but differs from that shown in FIGURE 4 in that one of the bridge voltage terminals 101 which are connected across a 12 v. D.C. voltage source in operation, is connected to the wiper arm 3 of the resistance device 2. The other bridge resistors are fixed resistors 102–105 and a variable resistor 106 which corresponds to the similar resistor 58 in FIGURE 4. The other terminal 101 is connected to the common terminal of resistors 100 and 102 and the unbalance voltage, if any, appears across terminals 107.

A simpler chopper 7 is employed consisting simply of a symmetrical transistor 108 the emitter-collector circuit of which is connected in series with a parallel resistance-capacitance circuit 109 between the terminals 107. The base of transistor 108 is connected through a semi-conductor diode 110 and a resistor 111 to a terminal 112, across which and earth a 12 v. A.C. voltage source is connected (for example, terminals 83 of the amplifier, see FIG. 6). The output of the chopper 7 is taken from across the collector/emitter electrodes of the transistor 108, one of which is earthed, and coupled by a conventional coupling circuit 113 directly to the input of the amplifier 8 which is the same as that shown in FIGURE 6 except that the input stage employing transistor 70 is omitted.

In an alternative arrangement (not shown), some form of chart recorder may be provided instead of the indicating arrangement, the shaft 4 then driving only the wiper arm 3 directly and being coupled by a mechanical linkage to the recorder pen drive. In such a case, the set-point index 11 and the control actuator 14 will usually be associated with the recorder and the control circuit 15 and controller 16 may be combined in an electrical controller of some form or replaced by a pneumatic or hydraulic controller.

It will be appreciated that the various apparatus described above represent a particular application of variable resistance devices according to the present invention and that they may equally be employed in any other application. Whilst a wire wound resistance device has been described, other kinds may be employed. Further, whilst a linear resistance element is employed, elements employing other laws may also be provided, the construction simply meaning that there is a factor of two difference between the law relating distance along the element to the resistance change involved and the law relating angular displacement of the wiper arm and the resistance change involved.

The claim:
1. A variable electric resistance device of the kind specified which comprises an arcuate resistance element, a wiper arm pivoted about an axis passing through a point on the circumference of the circle of which the arc forms part, the said axis being perpendicular to the plane of the circle, and a contact member which is carried by the wiper arm and is of sufficient length to remain in contact with the element over the whole of the permitted angular range of movement of the wiper arm.

2. A resistance device according to claim 1 in which the said point on the circumference of the circle lies directly opposite the mid-point of the element.

3. A resistance device according to claim 1 in which the resistance element is a linear one.

4. A resistance device according to claim 1 in which the resistance element is one in which the law relating resistance change to distance along the element is other than linear.

5. Electrical or electro-mechanical apparatus including a variable resistance device which comprises an arcuate resistance element, a wiper arm pivoted about an axis passing through a point on the circumference of the circle of which the arc forms part, the said axis being perpendicular to the plane of the circle, and a contact member which is carried by the wiper arm and is of sufficient length to remain in contact with the element over the whole of the permitted angular range of movement of the wiper arm.

6. Apparatus according to claim 5 which is a self-balancing apparatus including means for generating an unbalance signal representing any difference between the actual magnitude of an input variable and the represented magnitude of that variable as determined by the position of the wiper arm of the resistance device and an electric motor which is controlled in accordance with the unbalance signal to drive the wiper arm in such a sense as to reduce any unbalance signal towards zero.

7. Apparatus according to claim 6 which further includes an amplifier to the input of which the unbalance signal, or a signal derived therefrom, is applied and the output of which is applied to one or more windings of the motor to control the operation thereof.

8. Apparatus according to claim 6 which is a self balancing bridge apparatus having a first variable element which is the variable resistance device and a second variable element which is variable in accordance with the actual magnitude of the input variable.

9. Apparatus according to claim 6 in which the motor is coupled to drive an indicator or a recorder to indicate or record the magnitude of the input variable.

10. Apparatus according to claim 9 which further includes a set-point device for setting into the indicator or recorder a desired magnitude of the input variable, a controller and means responsive to any difference between the desired and actual magnitudes of the input variable for actuating the controller to perform a control action tending to reduce said difference towards zero.

References Cited

UNITED STATES PATENTS

| | | | |
|---|---|---|---|
| 2,621,275 | 12/1952 | Nielsen | 338—91 |
| 2,951,211 | 8/1960 | Brashear | 324—99 X |
| 2,996,670 | 8/1961 | Simonton | 324—99 X |
| 3,176,205 | 3/1965 | Peters | 324—99 X |

ARCHIE R. BORCHELT, *Primary Examiner.*

WALTER L. CARLSON, RUDOLPH V. ROLINEC,
*Examiners.*

J. J. MULROONEY, *Assistant Examiner.*